(No Model.) 2 Sheets—Sheet 1.

W. CRAIG.
VALVE FOR DIRECT ACTING ENGINES.

No. 485,787. Patented Nov. 8, 1892.

Witnesses:—

Inventor:—
William Craig
by attorneys

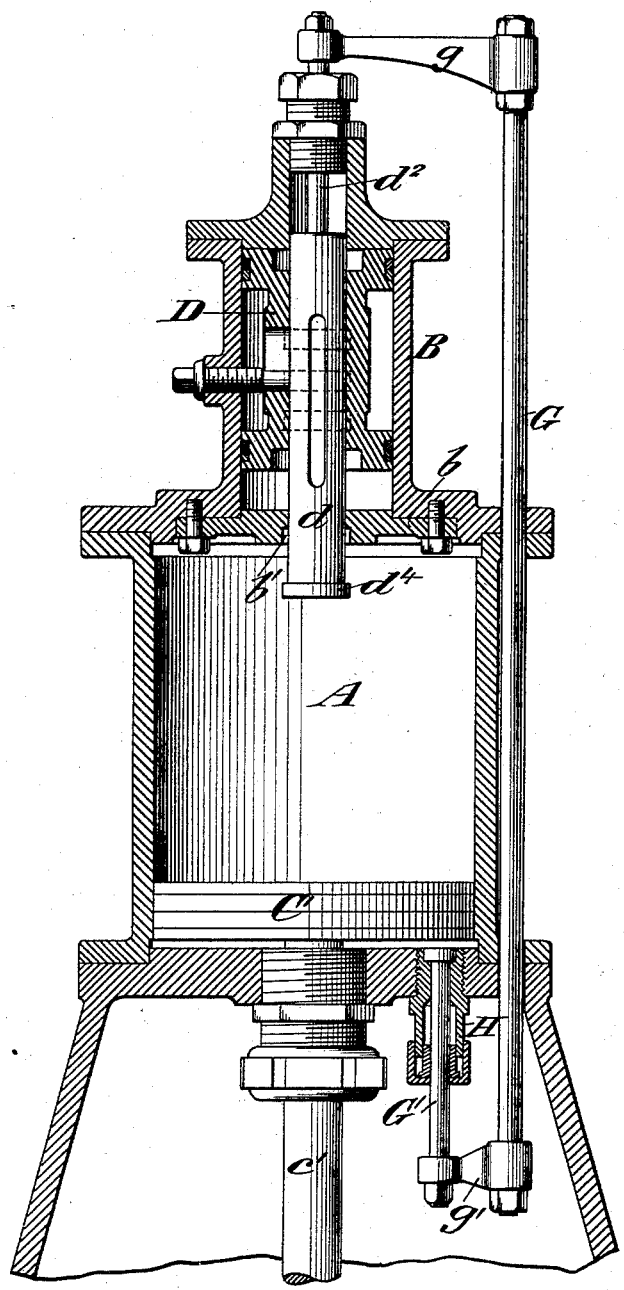

UNITED STATES PATENT OFFICE.

WILLIAM CRAIG, OF BROOKLYN, NEW YORK.

VALVE FOR DIRECT-ACTING ENGINES.

SPECIFICATION forming part of Letters Patent No. 485,787, dated November 8, 1892.

Application filed February 18, 1892. Serial No. 421,921. (No model.)

*To all whom it may concern:*

Be it known that I, WILLIAM CRAIG, of Brooklyn, in the county of Kings and State of New York, have invented a new and useful Improvement in Valves for Direct-Acting Engines, of which the following is a specification.

My invention relates to an improvement in valves for direct-acting engines in which an auxiliary valve operated by the movements of a piston admits the motive fluid to throw the main valve, and has particular reference to that class of valves shown and described in Letters Patent, No. 208,797 and No. 292,541, granted to me on October 8, 1878, and January 29, 1884, respectively, in which the auxiliary valve consists of a spindle working through the main valve.

One object is to provide a simple and effective means for holding the valves at the ends of their strokes until the proper time for operating them to change the stroke of the piston, and particularly to hold the auxiliary valve at the upper end of its stroke in engines of the vertical type.

Another object is to obviate the objection to running the reversing-rod into the main piston rod or plunger in an upright engine, as shown in my aforesaid Letters Patent, No. 208,797, such objection being the liability of water of condensation to collect and sometimes freeze in the pocket formed in the main piston rod or plunger.

A practical embodiment of my invention is represented in the accompanying drawings, in which—

Figure 1:
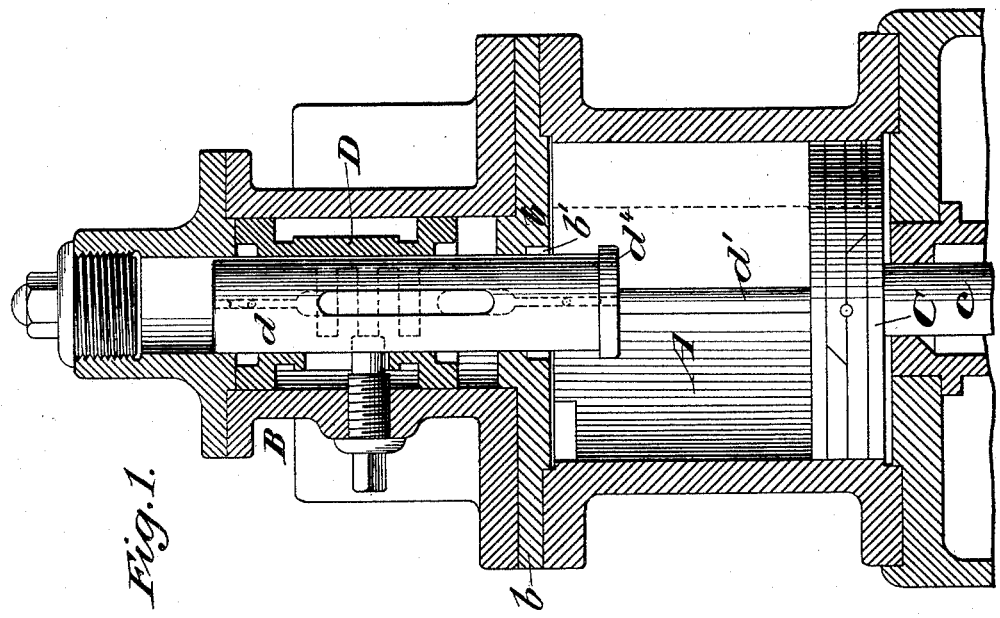
Figure 2:
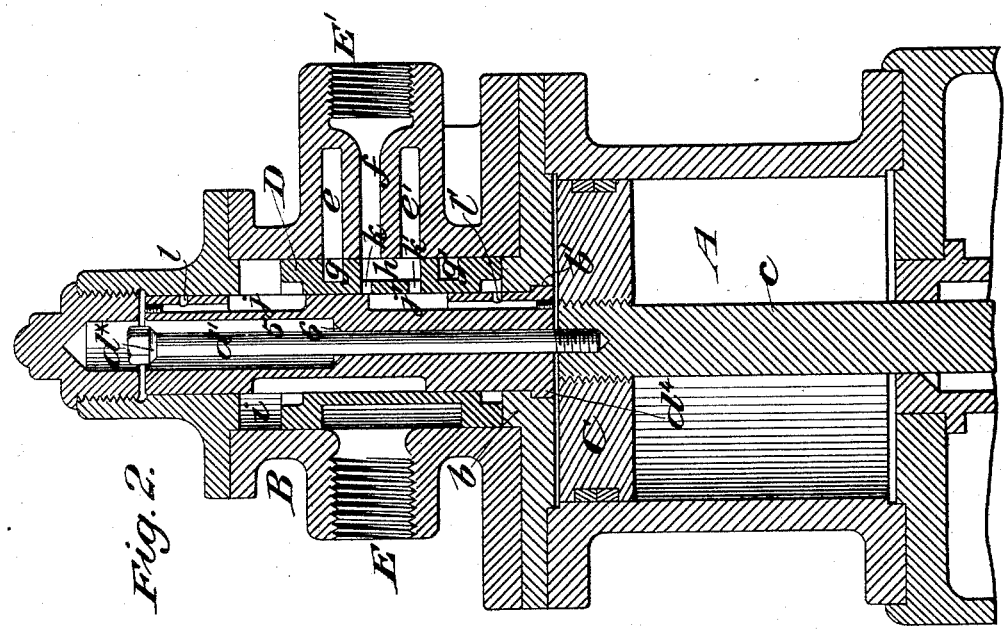

Figure 1 is a central longitudinal sectional view of the cylinder and valve-chest of an engine, showing the main valve in section and the auxiliary valve in elevation. Fig. 2 is a view of the same in longitudinal section in a plane transverse to that in which Fig. 1 is taken, showing both the main and auxiliary valves in section; and Fig. 3 is a similar view of a modified form, the auxiliary valve being shown in this view in elevation and the main valve in section.

A represents the cylinder, and B the valve-chest. In Figs. 1 and 2 the piston is represented by C, and in Fig. 3 by C'. The piston-rod in Figs. 1 and 2 is represented by $c$, and in Fig. 3 by $c'$. The main valve is denoted by D, and the auxiliary valve by $d$. The operating-rod $d'$ of the auxiliary valve $d$ is represented in Figs. 1 and 2, as affixed to the piston C by being screwed into its rod $c$; but in Fig. 3 the operating-rod $d^2$ of the auxiliary valve $d$ is represented as a stem affixed to the valve.

E is the port for the admission of steam to the valve-chest, and $e$ $e'$ the ports in said chest for the admission of steam to the opposite ends of the cylinder.

E' is the common exhaust-opening communicating with the port $f$ in the chest. $g$ $g'$ are the steam-ports of the main valve, and $h$ is the exhaust-cove thereof.

$i$ is the induction-steam cavity of the auxiliary valve, and $j$ $j'$ are the exhaust-cavities thereof, communicating, respectively, through ports $k$ $k'$ in the main valve with the exhaust-cove of the said valve, and thence with the common exhaust-passage $h$.

The several parts thus far described are quite similar in their structure and arrangement to the corresponding parts shown and described in my Letters Patent No. 208,797, hereinbefore referred to.

In the form shown in Figs. 1 and 2, the valve-operating rod or stem fits and works easily through a central bore in the auxiliary valve $d$, and it is provided at its upper end with a head or collar $d^*$. The upper part of the central bore of the said valve is counterbored, as shown at 5 in Fig. 2, large enough for the free passage of the head or collar $d^*$ and deep enough for the said head to move back and forth with the piston without interfering with the said valve $d$ at any time, but when the downward movement of the said valve is to be made for the purpose of raising the main valve, and thereby opening the lower steam-port $e'$ at the termination of the downward stroke of the piston, at which time the said head or collar comes upon the bottom 6 of the counterbore 5 and gives the said valve $d$ the necessary downward movement, the upward movement of the auxiliary valve is produced by the piston operating directly against the valve itself, as in my hereinbefore-mentioned patent No. 208,797. As the piston C moves toward the end of the cylinder from the position shown in Fig. 2 to that shown in Fig. 1, it is required that the auxiliary valve $d$ retain its position in which it was last forced by the piston until the proper moment for it to be positively operated by the piston to admit steam to the opposite end of the cylinder. To accomplish this I provide a greater area for steam-pressure at the end of the valve toward the cylinder than at the end farthest from the cylinder, the difference in area being sufficient to enable the steam-pressure to hold the auxiliary valve to its seat against gravity. This difference in area is attained by enlarging the end of the auxiliary valve $d$ toward the cylinder, preferably by means of a flange $d^4$, surrounding the end of the valve and adapted to be received within a recess $b'$ in the gland $b$, which separates the valve-chamber from the cylinder. It is intended that the flange $d^4$ shall seat at the bottom of the recess $b'$ so truly as to shut out the entrance of steam and thereby take off steam-pressure in a direction toward the cylinder to the extent of the area of the edge of the ring. This, because of the free admission of steam to the stem $d'$, will admit of an upward pressure of steam exerted upon the auxiliary valve greater than the downward pressure upon the same upon the end farthest from the cylinder to an amount corresponding to the area of the edge of the flange $d^4$, which of course may be made greater or less, according to the weight to be overcome. This very simple arrangement does away with any considerable amount of packing and fitting, since the gland $b$ may be fitted to the flange $d^4$ before it is bolted in position.

In the form shown in Fig. 3 the stem $d^2$ of the auxiliary valve extends through the end of the valve-chamber opposite or farthest from the cylinder, and is there connected by an arm $g$ with the operating-rod G, the lower end of which is connected by an arm $g'$ with a rod G', which extends upwardly through a stuffing-box H to a point within the cylinder A, where it is engaged by the piston to move the auxiliary valve $d$ toward the cylinder A, its movement in the opposite direction being fixed by the engagement of the piston C' with the end of the auxiliary valve.

In Fig. 2 I have shown provision for locking the main valve D at either end of its stroke by means of passages $l$ and $l'$, which form communications between the exhaust-coves $j\ j'$ of the auxiliary valve $d$ and the top and bottom of the valve-chest. These passages are represented as formed by drilling holes through the ends of the auxiliary valve $d$ into the exhaust-coves thereof and drilling into said holes through the side of the valve and then plugging the outer ends of the first-named holes. When the main valve is at the lower end of its stroke, as shown in Fig. 2, the lower end of said valve is open to the exhaust through the passage $l'$, and when the said valve will be at the upper end of its stroke the upper end will be open to the exhaust through the passage $l$, and when either end is thus relieved of pressure the valve will be locked by the pressure of steam on the other end.

What I claim as my invention, and desire to secure by Letters Patent, is—

1. The combination, with the cylinder and the valve-chest at one end thereof, of a main valve and an auxiliary valve therein, the latter communicating at one end with the interior of the cylinder, the end of the auxiliary valve in communication with the cylinder being enlarged and adapted to seat against the end of the cylinder outside of the body of the auxiliary valve, substantially as set forth.

2. The combination, with the valve-chest and cylinder and a supporting partition or gland provided with a recess on the side toward the cylinder, of a valve having one of its ends extended through the partition or gland within the cylinder and provided with an enlargement adapted to seat within the said recess in the gland or partition, substantially as set forth.

3. The combination, with the main valve and its chest, of the auxiliary valve working through the main valve and having exhaust-coves $j\ j'$ for exhausting through the main valve and having passages $k\ k'$ from said coves with lateral communication to the valve-chest at the ends of the main valve, substantially as and for the purpose herein set forth.

4. The combination, with the engine cylinder and piston, the valve-chest at one end of the cylinder, and the main valve within said chest, of the auxiliary valve working within the said main valve and having a central bore, the part of which farthest from the cylinder is counterbored, and an operating-rod for the latter valve affixed to the engine-piston, working through the latter valve, and having a head or collar at its outer end, substantially as herein described.

WILLIAM CRAIG.

Witnesses:
   FREDK. HAYNES,
   I. B. DECKER.